(12) United States Patent
Karri et al.

(10) Patent No.: US 11,928,047 B2
(45) Date of Patent: Mar. 12, 2024

(54) CONTEXTUAL DATA GENERATION FOR APPLICATION TESTING IN MIXED REALITY SIMULATIONS

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Kamal Kiran Trood Yamala, Visakhapatnam (IN); Suresh Nagulakonda, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 17/487,299

(22) Filed: Sep. 28, 2021

(65) Prior Publication Data

US 2023/0098596 A1 Mar. 30, 2023

(51) Int. Cl.
*G06F 11/36* (2006.01)
(52) U.S. Cl.
CPC ...... *G06F 11/3664* (2013.01); *G06F 11/3684* (2013.01); *G06F 11/3688* (2013.01)
(58) Field of Classification Search
CPC ........... G06F 11/36–3696; G06F 9/455; G06F 11/261; G06F 11/3457–3461
See application file for complete search history.

(56) References Cited

U.S. PATENT DOCUMENTS

| | | | |
|---|---|---|---|
| 9,721,386 B1 | 8/2017 | Worley, III et al. | |
| 10,846,205 B2* | 11/2020 | Psiaki | ................... G06T 19/006 |
| 2018/0150387 A1 | 5/2018 | Kogan et al. | |
| 2019/0196940 A1* | 6/2019 | Psiaki | ................. G06F 11/3664 |

(Continued)

FOREIGN PATENT DOCUMENTS

CN 105374131 A 3/2016

OTHER PUBLICATIONS

"Digital Twins for Predictive Maintenance", The MathWorks, Inc., accessed online Sep. 2, 2021, 25 pages.

(Continued)

*Primary Examiner* — Todd Aguilera
(74) *Attorney, Agent, or Firm* — Stephen J. Walder, Jr.; Robert D. Bean

(57) ABSTRACT

Mechanisms are provided to generate a test dataset for software application development. A baseline mixed reality (MR) environment simulation of an existing process is generated that models applications of an application landscape. A requirement for an application that is to be developed is received and a MR component model is generated to represent the application based on a machine learning computer model processing of the requirements data structure and a knowledge corpus. The MR component model modifies the baseline MR environment simulation, and executes the modified MR environment simulation to simulate the modified MR environment simulation. The simulation is monitored for user input specifying a contextual scenario and context data is collected from the MR component (Continued)

models of the modified MR environment simulation. A test dataset for testing a coded version of the SUD application is generated based on the contextual scenario and the collected data.

20 Claims, 5 Drawing Sheets

(56) References Cited

U.S. PATENT DOCUMENTS

2019/0278697 A1    9/2019  Sharma et al.
2020/0065123 A1*   2/2020  Yang .................... G06F 9/455

OTHER PUBLICATIONS

Brownlee, Jason, "A Gentle Introduction to Generative Adversarial Networks (GANS)", Machine Learning Mastery, Jun. 17, 2019, 29 pages.

Mehra, Rohit et al., "XRaSE: Towards Virtually Tangible Software using Augmented Reality", 2019 34th IEEE/ACM International Conference on Automated Software Engineering (ASE), Nov. 10-15, 2019, 4 pages.

Qiao, Qianzhe et al., "Digital Twin for Machining Tool Condition Prediction", Elsevier Ltd., 52nd CIRP Conference on Manufacturing Systems, Jun. 12-14, 2019, 6 pages.

* cited by examiner

CONTEXTUAL DATA GENERATION FOR APPLICATION TESTING IN MIXED REALITY SIMULATIONS

BACKGROUND

The present application relates generally to an improved data processing apparatus and method and more specifically to mechanisms for generating contextual data from mixed reality simulations for use in performing application testing.

The software development lifecycle process involves a number of software development activities. Initially, there is a requirement extraction stage in which clients, software engineers, domain experts, and the like all collaborate to determine what the software application's purpose is, how it should work, and what it should ultimately do, resulting in a set of requirements for the software application. Thereafter, there is a feasibility analysis stage in which the requirements are analyzed and steps are determined for how to achieve the requirements, resulting in a software requirement specification that specifies everything that must be developed to complete the software application. This stage is followed by the design stage where the overall system architecture is designed by defining the functionality of modules and their interactions, a building and coding stage where software designers use programming tools and their own expertise to generate the actual code for the software application, and then a testing stage in which the code is tests to determine that it works correctly and does not include errors, or bugs. Once the software application is tested and determined to perform satisfactorily, the software application is deployed and maintained through software application support.

In order to ensure that the software application is operating properly, it is important to test the software application's code to make sure that there are no errors and that the software application achieves performance and results requirements. However, it is often the case that the testing does not reflect all of the situations that may be encountered after deployment of the software to its runtime environment.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating a test dataset for software application development testing. The method comprises generating a baseline mixed reality (MR) environment simulation of an existing business process comprising one or more first MR component models that model applications of an application landscape of the existing business process, receiving a requirements data structure for a software under development (SUD) application that is to be developed, and generating one or more second MR component models, to represent the SUD application, based on a machine learning computer model processing of features extracted from the requirements data structure and knowledge data in a knowledge corpus. The method further comprises aggregating the one or more second MR component models with the one or more first MR component models of the baseline MR environment simulation to generate a modified MR environment simulation, and executing the modified MR environment simulation to simulate the MR environment. The method also comprises monitoring the simulation of the MR environment for user input specifying a contextual scenario and collecting data from the one or more first MR component models and one or more second MR component models in response to detecting user input specifying a contextual scenario. Moreover, the method comprises generating a test dataset for testing a coded version of the SUD application based on the contextual scenario and the collected data corresponding to the contextual scenario.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
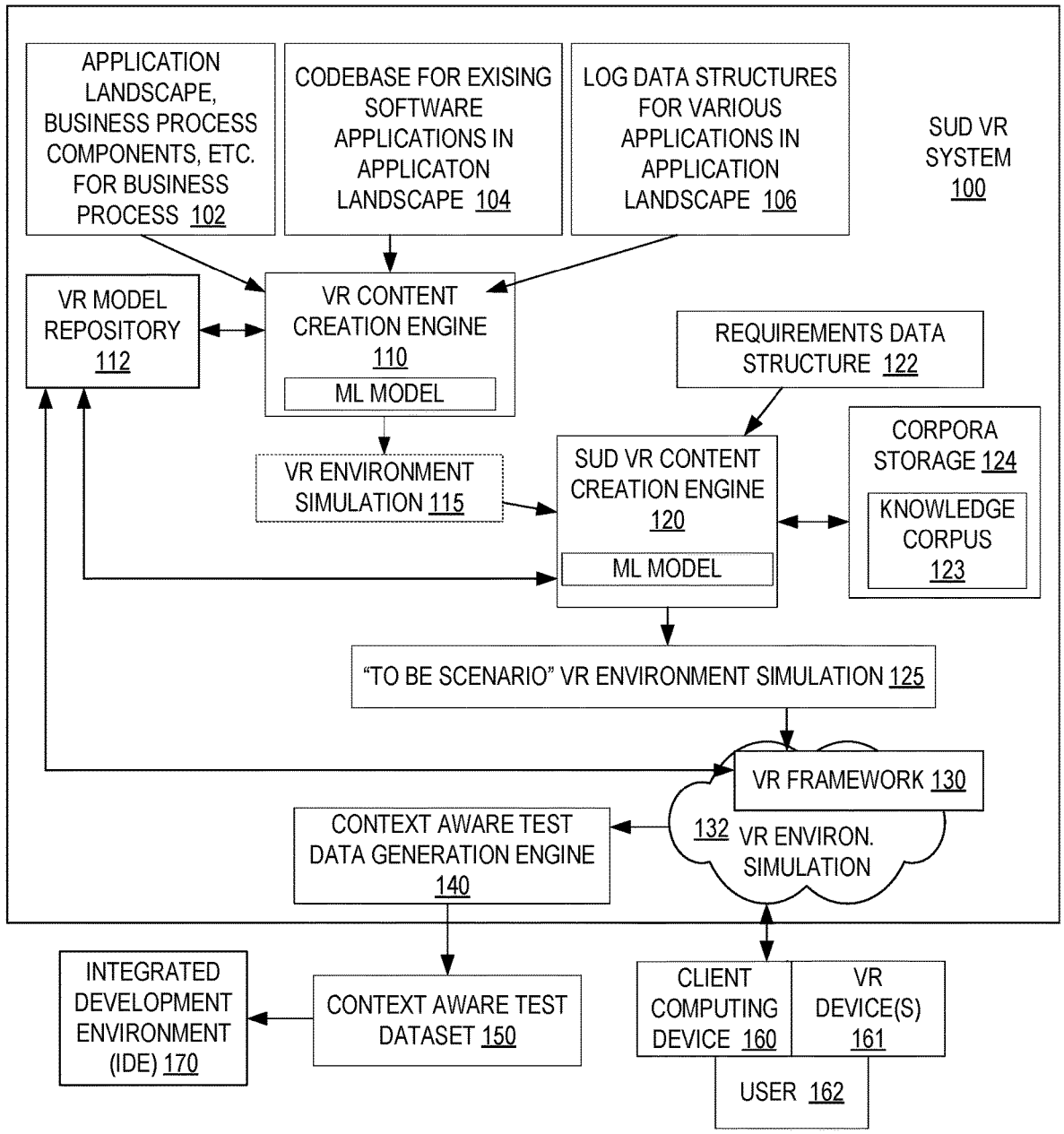
FIG. 1 is an example block diagram outlining an overall operation of a software under development (SUD) virtual reality system for generating contextual testing data in accordance with one illustrative embodiment.

The illustrative embodiments provide an improved computing tool and improved computing tool process that generates a simulation of an expected software application deployment environment, which includes other software applications with which the software application being developed (hereafter referred to as the software under development, or SUD) operates, as well as any physical assets with which the SUD operates and/or physical assets of other elements of the simulated environment. The simulation of the expected software application deployment environment will be assumed in this description, for illustrative purposes, to be a virtual reality (VR) simulation, however is not limited to such. To the contrary, the simulation of the environment may include augmented reality, virtual reality, any combination of augmented reality and virtual reality, of any other simulation of a deployment environment in which users may interact in a manner that simulates their physical presence relative to digital simulations of digital and/or physical assets of a business process. These various types of environment simulations are collectively referred to herein as "mixed reality" (MR) simulations. Thus, references to mixed reality or MR are intended to cover VR, AR, or any other deployment environment simulation as mentioned above.

In some illustrative embodiments, the deployment environment simulation, e.g., virtual reality simulation simulates the functional business environment in which the SUD is expected to be deployed which includes virtualized representations of all of the software applications, data sources, etc. in the functional business environment (referred to herein as the "deployment environment"), and especially those that the SUD is expected to interact with. In some illustrative embodiments, the virtual reality simulation further represents physical environments and physical devices with which the software application operates including computing devices, sensors, cameras, various types of physical equipment, such as manufacturing equipment in a factory or fabrication environment, and the like. In short, any digital and physical assets, e.g., software applications, sources of data, and/or physical assets or devices, with which the SUD, or other elements of the virtual environment, may operate may be represented as virtual reality components of the virtual reality simulation without departing from the spirit and scope of the present invention.

The virtual reality simulation of the deployment environment simulates the real-world conditions under which the SUD will be deployed so that the virtual reality simulation can be used to generate contextual data for use in testing the SUD prior to the SUD being coded, prior to testing of the SUD, and prior to the SUD being deployed to the actual real-world deployment environment. In this virtual reality simulation of the deployment environment, a user, such as a business level user, software developer, software test engineer, or the like, can view and manipulate the virtual environment including the various virtual reality components in which the SUD operates and/or other virtual reality components of the virtual reality environment (or simulation) and their software applications with which the SUD interacts, to generate contextual data that is then captured and used as testing data for testing the SUD during the testing stage of the software development lifecycle.

These virtual reality components are virtual reality models, such as digital twin models, representing real-world components of a particular business process. These digital twins may be data driven computer models that utilize deep learning computer models, neural networks, generative adversarial networks, or the like, which are trained to simulate the real-world components and provide predictions regarding the operational characteristics of the real-world components. For example, in a manufacturing business process, the digital twin models may represent different machinery of a shop floor that are involved in the manufacturing, packaging, and/or shipping of the goods, along with any software applications associated with those real-world components. Each digital twin model has a predictive model that is trained through machine learning processes to generate predicted outputs of the state of the real-world component that is modeled given a set of inputs, such as data from simulated sensors, data representing input materials, or any other data that may be used as a basis for simulating the operation of the real-world component. The digital twin models may be developed and stored in a repository for use in virtual reality simulations and artificial intelligence simulations, such as in the case of the IBM Digital Twin Exchange, available from International Business Machines (IBM) Corporation of Armonk, New York. An example of the use of digital twin technology is described in Qiao et al., "Digital Twin for Machining Tool Condition Prediction," $52^{nd}$ CIRP Conference on Manufacturing Systems, Elsevier, Ltd. 2019.

The virtual reality components operating in the virtual reality environment or simulation generate contextual data represent the business process that is modeled in the virtual reality environment. The contextual data provides data regarding the actual deployment environment and situations or conditions that the SUD is likely to encounter after deployment. By manipulating the virtual environment, the contextual data is modified, and the virtual reality simulation responds in a manner that simulates the real-world responses to such modifications. The contextual data associated with the modifications, the virtual reality environment reactions, and the SUD responsive actions may be collected as context aware (or contextual) data that may be converted to contextual testing data for testing the SUD after coding and during a testing stage of the software development lifecycle. Because the testing data is generated from the virtual reality simulated deployment environment, and captures data corresponding to user interactions with this virtual reality simulated deployment environment, the testing data provides a greater likelihood that a more thorough testing of the SUD is achieved and ultimately a less error prone and better software application being developed prior to deployment. This results in less end user frustration due to errors or bugs and reduces costs for maintaining software applications as there will be less need for patches or other maintenance updates and user technical assistance to address errors or issues generated from unforeseen events after deployment of the application software.

Thus, users interact with the virtual reality (VR) simulation of the deployment environment and manipulate the deployment environment to generate various contextual situations or scenarios. The VR simulation is generated from knowledge of the existing digital and physical assets, e.g., applications, computing device characteristics, sensor characteristics, etc. in the deployment environment, where this knowledge includes historically gathered data from the existing applications, working procedures, application logs, etc. The VR simulation of the deployment environment is referred to as a "current" or "as is" VR model or environment. In addition, the VR simulation implements a "to be developed" requirements specification for the VR environment that indicates modifications to the VR environment that is being simulated, e.g., VR component representations of newly added, modified, or removed digital and/or physical assets with which the SUD is expected to operate in the actual real-world deployment environment. The "to be developed" requirements specification indicates how the SUD is to be "plugged into" the deployment environment so that the SUD may be rendered as one or more virtualized components, representing digital and/or physical assets associated with the SUD, of the VR simulation and may be likewise manipulated within the VR simulation by a user to generate contextual scenarios for gathering of contextual data to generate context-relevant test datasets. VR component(s), and representations of the SUD and its digital/physical assets as VR components, are generated and added to the VR environment or simulation in conjunction with the existing VR components and representations of their corresponding applications. This modified VR environment or simulation is referred to as the "to be scenario".

The user interactions with the VR simulation (which operates as the "to be scenario" since the SUD is yet to be finalized), and resulting context aware (contextual) data generated by the VR simulation, are recorded and stored for later use in developing the contextual test data that is used to test the SUD. While recording the user interactions with the "to be scenario" of the VR simulation, the "to be scenario" may be dynamically updated representing the responsiveness of the environment to the user interactions. Thus, for example, as the user modifies characteristics, operational parameters, and the like, of the other software applications, data sources, devices, and the like, in the VR simulation, the simulation reacts, with regard to the various VR components and applications/software associated with these VR components including the SUD, and the data detailing these reactions is recorded as contextual data for use in test data generation.

The recorded data may be associated with defined "context scenarios" tied to the particular user interaction, e.g., if the user increases a value of parameter X of a software application, a context scenario of "increase of parameter X of software application Y" may be dynamically defined and the corresponding data gathered from the VR simulation as a consequence of the change in parameter X is recorded and stored as part of this context scenario. If the user moves a VR component's position or orientation relative to other VR components, e.g., moving a virtualized camera's position and orientation relative to a virtualized piece of manufacturing equipment, this modification may be stored as a separate scenario along with recorded data gathered after simulating the modified VR environment.

Moreover, the improved VR simulation based computing tool and computing tool process gradually evolves the "to be scenario" VR model used by the VR simulation based on the activities and interactions that the user performs and the reactions by the other components of the VR simulation of the deployment environment and, accordingly the requirements of the "to be developed" software application, or SUD, are updated. For example, assume a product packaging environment that is modeled in a VR environment using digital twin technology. With the mechanisms of the illustrative embodiments, a new functionality may be specified by a user, such as a business level user, as a requirements data structure, e.g., final packaging is to be done with a robotic system rather than a manual system. As a result of this modification to the existing packaging process involving various existing machines and software, new types of data are to be captured, new machines are to be installed, etc. In this example case, a manufacturer of a "to be installed" machine may provide a VR model, e.g., digital twin, of the machine, or a third party service or source computing system may have developed a VR model, e.g., digital twin, of the machine based on manufacturer provided specification data for the machine indicating how the machine operates, its physical characteristics, and one or more image sequences depicting the machine and its operation. Per the new requirement, the VR model of the new machine may be identified as a machine satisfying the new requirement and may be added to the VR environment simulation as a new additional VR component, a replacement component for one or more existing VR components, or a modified version of an existing VR component. Based on a machine learning (ML) trained artificial intelligence (AI) computer model, a knowledge corpus of components for the particular type of deployment environment may be analyzed based on the new requirements to select the appropriate components and corresponding VR models to use to modify the VR environment and determine how to modify the VR environment to include the selected components, e.g., which old machine is to be removed, what capabilities are removed, and what capabilities are to be added.

The modified VR environment may be simulated to determine if the new requirement is achieved, e.g., a specified amount of accuracy in quality evaluation of a manufacturing process, by the modification to the VR environment and if not, then the ML trained AI computer model may be executed to select additional or a different modification to the VR environment to implement to attempt to achieve the new requirement. This process may be repeated in an iterative fashion until the new requirement is achieved or a predetermined number of iterations have been performed, to thereby evolve the VR environment simulation to achieve the new requirement.

Based on the identified contextual situation while navigating the "to be scenario" of the VR simulation, the improved computing tool and improved computing tool process of the illustrative embodiments gathers data from the VR environment simulation for generation of the test data. The test data is output for use in testing the "to be developed" software application, or SUD, after coding of the software application in the software development lifecycle. In generating the test data, the mechanisms of the illustrative embodiments identifying the existing capabilities of the existing process represented in the "as is" VR environment simulation, e.g., the capabilities of the old machine which is replaced and the capabilities of the new components, e.g., the new machine which is to be installed, as well as the specifications of the new machine. The mechanisms of the illustrative embodiments identify which component is new, where the integration of the new component is performed, if the removal of functionality because of the replacement of the old component can create any new problems, what new capabilities are added, what will be the change in the workflow and process steps, etc., and will identify what testing data is required based on these determinations.

The mechanisms of the illustrative embodiments further provide tools to identify textual comments made by the software testers for contextual scenarios for which context data should be gathered via the mechanisms of the illustrative embodiments. These comments are translated into VR content, similar to the translation of the requirements data structure into VR content, for rendering in the VR simulation, with this VR content being invoked within the VR simulation based on identified user privileges and the context while the user is interacting with the VR simulation, e.g., if a tester has made comments about "user experience design" with regard to the SUD which may be a mobile device application, this comment is translated into VR content and cascades that information to "UX design" teams and other relevant personas in the organization.

The test data generated from the contextual data gathered from the VR environment simulation may be output to IDE tools used to develop the SUD. That is, after the SUD is coded from the requirements specification in a manner generally known in the art, the resulting code may be tested using the test data generated from the contextual data gathered from the VR environment simulation. As this test data will more closely represent the actual situations encountered in the deployment environment, and will be more comprehensive by covering contextual changes that software testers may not have recognized or foreseen but were captured by the VR environment simulation, a more thorough and intensive testing of the coded SUD will be able to be performed and thus, more errors or bugs identified, resulting in a more robust final coded product that is generated and deployed to the real-world environment.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example block diagram outlining an overall operation of a software under development (SUD) virtual reality system for generating contextual testing data in accordance with one illustrative embodiment. It should be appreciated that, in accordance with some illustrative embodiments, the block elements shown in the block diagram of FIG. 1, and other block diagrams included in this description, may be implemented as software components executing on one or more computing devices which are specifically configured with these software components to operate as specialized computing devices that perform the functionality attributed to the corresponding block elements in the figure. In some illustrative embodiments, these block elements may be implemented as dedicated hardware devices that are hard coded with circuitry, firmware, and the like, to perform the particular functions attributed to the block elements. In still other illustrative embodiments, any combination of dedicated hardware devices or specially configured computing devices executing specific software components may be used without departing from the spirit and scope of the present invention.

As shown in FIG. 1, the SUD virtual reality (VR) system 100 comprises a baseline VR content creation engine 110, a SUD VR content creation engine 120, a VR framework 130, and a context aware test data generation engine 140. The baseline VR content creation engine 110 operates on input data 102-106, and further based on a VR model repository 112 that stores VR models, e.g., digital twin models, for digital and/or physical assets of a business process that are to be represented as VR components. The VR components of physical assets may include VR models of physical machines, sensors, and other physical elements that are physically present in a physical real-world environment with which software applications, and specifically the SUD, may operate. Examples of such physical assets include physical machines, computing devices, sensors, etc., of a manufacturing plant, fabrication facility, or the like, which have associated software applications. The SUD VR content creation engine 120 comprises logic for creating a VR component and corresponding software application representation from a SUD requirements specification 122, and combine that created VR component with the baseline VR components, replace a baseline VR component with the created VR component, or modify a baseline VR component to include the SUD, so as to generate a "to be scenario" VR environment simulation 125. The VR framework 130 operates to generate the VR environment and simulate its operation to thereby simulate the real-world deployment environment for the SUD such that users 162, via their client computing devices 160, may interact with the VR environment simulation and thereby generate test case scenarios. The context aware test data generation engine 140 comprises logic that monitors the VR environment simulation and captures contextual data from the VR environment simulation while the user 162 interacts with the VR environment simulation 132. The context aware test data generation engine 140 further comprises logic that generates the test datasets 150 for different contexts based on the captured contextual data and provides it to an IDE 170 for use in testing a coded version of the SUD.

To demonstrate the operation of the illustrative embodiments in more detail, as shown in FIG. 1, the baseline VR content creation engine 110 receives first input data 102 defining the application landscape, business process components, and the like, for an existing business process that is to be simulated in a VR environment simulation. This application landscape and business process component input data 102 (or application landscape input data) includes specifications of the existing software applications involved in the business process as well as any other components, such as physical machines, computing devices, sensors, user interface devices, and the like, from a business user level of understanding, i.e., the input data 102 may not have the specific coding and logs of the individual software applications but rather a higher level business user level of detail of information about each of the software applications involved in the business process as well as the equipment with which these software applications operate, e.g., particular manufacturing machines, computing devices, sensors, and the like, that the software applications monitor and/or control. The application landscape and business process component input data 102 may specify the functional and non-functional requirements of each of the software applications currently present in the existing business process. The software applications are closely connected with each other with each software application performing a set of business functionalities, e.g., packaging application, machine maintenance application, etc. The application landscape itself is a coherent set of interconnected applications within the enterprise, business, or organization. For example, in a product packaging business process environment, the application landscape may comprise the digital and physical elements that are involved in the process of packaging products including the packaging machine application and machinery, shipping label printing and affixing application and machinery, packaging quality evaluation application and machinery, etc., which are all interconnected and sharing data with each other. The application landscape input data 102 provides information to associate digital and physical assets with one another, determine the relative locations and orientations of the assets, as well as high level interrelated functionality of the assets with regard to each other.

The baseline VR content creation engine 110 also receives second input data 104 comprising the codebase for each of the existing software applications specified in the application landscape 102. This application codebase input data 104 includes the actual code and metadata associated with the software applications that currently exist in the business process. The metadata and codebase input data 104 specify the digital and physical assets, or components, of the business process that the corresponding software application interacts with and what types of data the software application processes and outputs. The metadata and codebase input data 104 specify the logic of the applications indicating how the applications operate as well as any dependencies among the applications of the application landscape. The combination of the application landscape input data 102 and codebase input data 104 provides information from which the business logic for the business process is extracted, e.g., business rules, identifies how the data is processed, the outputs computed by the applications, and the actions taken by the applications as well as their corresponding physical assets.

The baseline VR content creation engine 110 also receives third input data 106 comprising the logs from the various software applications in the application landscape detailing log events that occur in the existing business process. The log input data 106 provides information indicating usage patterns of the software applications in the application landscape of the existing business process, application health, corresponding component health and usage patterns, and the like. By analyzing the log input data 106, the VR content creation engine 110 is able to identify how the applications of the application landscape are interconnected, the data that is processed by the applications, and problems encountered by the applications in the application landscape.

The input data for the existing business process, i.e., input data 102-106, may come from various different source computing systems, such as computing systems executing the software applications in the application landscape of the existing business process, computing systems that monitor the equipment implementing the business process, sensor processing computing systems, or the like. The input data 102-106 represents the functional and non-functional requirements of the software applications currently present in the existing business process, the application logs from each of the software applications currently present in the existing business process, the usage patterns and types of data handled by each of the software applications currently present in the existing business process, and business level information about the software applications currently present in the existing business process.

For example, taking a leather manufacturing process as an example of an existing business process that is to be simulated via a VR environment simulation. In this case, the VR environment simulation needs to simulate not only the physical equipment associated with the business process, e.g., the raw material processing equipment, but also the software applications of the business process that monitor and control this equipment of the business process. Thus, for example, in the leather manufacturing process, various software applications are used at the business process level to monitor and control the operation of the equipment used to prepare leather for use including: (1) production application(s) that captures data indicative of output from each of the individual pieces of equipment, types of raw materials used by the equipment, final products generated by the equipment, process steps followed by the equipment, etc.; (2) quality application(s) that capture data characterizing the quality of raw, semi-finished, and final products in different stages of the business process; (3) maintenance application(s) which capture data characterizing the health of each piece of equipment, the physical locations of each of the pieces of equipment within the real-world environment relative to other pieces of equipment, types of equipment used, spare parts used in or by the equipment, etc.; (4) water treatment application(s) which capture where water is used and how the water treatment is done as part of the business process; (5) production planning application(s) which capture data characterizing the demand and production plan for the business process; (6) warehouse application(s) that capture the types of final products produced and stored in the warehouse; and (7) raw material application(s) which capture data characterizing the types of raw materials used by the business process to generate the final products. Each of these different applications may be associated with different types of equipment and computing devices present in the business process, may obtain data from various sensors associated with the equipment, and there may be multiple instances of the equipment and corresponding applications for different portions of the business process, e.g., there may be a first maintenance application instance associated with a first piece of equipment and a second maintenance application instance for a second piece of equipment. By representing each of these applications in the application landscape, codebase, and log input data 102-106, data characterizing each of the elements of the business process are captured for use in generating a VR environment simulation of the business process.

The various input data 102-106 represent the captured application specific information, application logs of various types, and application code/metadata from the existing business process which is then used to generate a VR simulation of the business process, e.g., a VR simulation of how raw materials are transformed into a leather product that is then stored in a warehouse in the example business process given above. That is, the baseline VR content creation engine 110 takes each of these sources of input data 102-106 and extracts features from this data that are used as input to classify applications of the application landscape according to their types and thereby predict the VR models that should be used to represent those applications and their corresponding equipment in the VR environment simulation. This prediction of VR models may make use of pre-existing VR component models in a VR component model repository 112, for example. These VR component models may be defined in any suitable manner so long as they model the behavior of the real-world components as virtual representations of the real-world components. For example, a digital twin modeling process may be used to represent the VR components associated with software applications of the application landscape for the existing business process as corresponding digital twin computer models. The digital twin computer models will be described in greater detail hereafter with regard to FIGS. 3A and 3B.

The baseline VR content creation engine 110 may implement a machine learning (ML) trained predictive and/or classification computer model, such as a neural network, deep learning neural network, generative adversarial network (GAN), or the like, to select VR component models from the repository 112 to represent the applications and their corresponding equipment components. The VR component models model the physical assets, e.g., physical equipment, which may then be configured with the software applications VR models for representing the combination of the business process with the physical assets, or equipment, in the VR environment simulation. The VR models for the components and/or applications may include visual representations of these components within the VR environment so that a user is able to, via VR interfaces, interact with the VR model representations as if the user were in the real-world environment that is simulated via the VR environment. The ML trained computer model receives features extracted form the inputs 102-106, such as features indicating types of physical assets with which the applications operate, types of data the applications process, types of outputs generated by the applications, interrelationship information about the applications, etc., to generate, for each application in the application landscape, a prediction or classification of a VR model that represents the physical asset(s) with which the application operates, e.g., an application that processes product dimension information and selects a package for shipping the product may be associated with a piece of packaging equipment that places the product in a shipping package.

These VR models for the various applications may be combined based on interrelatedness and dependencies identified in the input data 102-106 to generate a VR environment simulation. For, in the previously mentioned example of a leather manufacturing business process, the VR environment may simulate the actual manufacturing floor of a factory with VR models being visually represented as images of equipment with their associated applications represented in conjunction with those images of equipment. The VR models may include VR user interface elements through which the users are able to perceive the VR representation of the component and modify the operation of these components within the VR environment.

Thus, the baseline VR content creation engine 110 processes the input data 102-106 to extract features indicative of VR components that need to be rendered as part of the VR environment simulation, as well as information about the relative positioning and/or orientation of such VR components within the VR environment simulation, and uses this information to identify VR models, e.g., digital twin computer models, from the VR model repository 112 to represent these various components. The VR content creation engine 110 then creates the VR environment simulation 115 by combining the selected VR models in accordance with the relative positioning and/or orientation information and application dependencies, and performs operations for facilitating the data flow from one VR component, and corresponding applications(s), to another in accordance with the business process being modeled by the VR environment simulation, as defined by the analysis of the inputs 102-106. That is, if one VR component received input from another VR component, and generates an output that is then input to another VR component, as indicated in the analysis of the inputs 102-106 this linkage between VR components is generated and facilitated by the VR content creation engine 110 when creating the VR environment simulation.

The generated VR environment simulation represents the "As Is" business process scenario VR model. The VR environment simulation may be accessed via suitable VR equipment, e.g., VR headsets, software, computing devices, etc., by users so that the users are able to interact with the VR components. That is, the VR environment simulation 132 comprising the various selected VR models and their linkages may be provided as an input into a VR framework 130 that renders the VR environment simulation 115. Users may utilize VR equipment coupled to client computing devices 160 to virtually enter the VR environment simulation 132 and interact with the VR components in the VR environment.

When a software application is to be developed, or a modification to an existing business process is to be implemented through the addition, replacement, or removal of a digital and/or physical asset (collectively referred to as a "modification" of the business process), the requirements for the modification are gathered and used to generate a requirements specification data structure 122. The requirements specification data structure 122 specifies functional and/or non-functional requirements for the modified VR environment components, e.g., the particular software under development (SUD) and/or physical assets with which the SUD operates, but without having the actual codebase, metadata, or logs. That is, the requirements specification data structure 122 may comprise content similar to the application landscape and business process component input data 102 but defined for a software application that has not yet been coded or developed. Thus, at this stage, the SUD is rendered in the VR environment based on a business level description comprising the requirements of the SUD. This rendering of the SUD may be based on a high level description of the modifications to the business process, e.g., the business process currently achieves 80% accuracy in packaging quality assessments, and it is desired that this be increased to 90% accuracy, such that the requirements data structure 122 may specify a 90% accuracy requirement for packaging quality assessment physical and/or digital equipment of the business process.

A SUD VR content creation engine 120 receives the requirements specification data structure 122. The SUD VR content creation engine 120 operates similar to the VR content creation engine 110 in that the SUD VR content creation engine 120 uses a machine learning (ML) trained computer model to classify and/or predict a VR component model from the repository 112 to represent the SUD and its corresponding associated digital and/or physical assets. The selected VR component model is then configured according to the requirements specification data structure 122 to generate a VR component model specific to the requirements data structure 122.

The modifications specified in the requirements data structure 122 may be modifications to digital and/or physical assets and may include addition of new VR model components, replacement of existing VR model components, or modification of the existing VR model components. For example, in a product packaging business process, it may be desirable to replace a manual inspection stage of the process that involves manual inspection of package quality with a robotic computer assisted process to achieve a higher level of accuracy. The requirements specification data structure 122 may specify a business level user level definition of the modification that is to be implemented, which in this example would be to add to the business process an automated packaging quality assessment device with at least 90% accuracy. These requirements may be input to a ML trained computer model that operates based on the characteristics of the VR component models in the repository 112 as well as a knowledge corpus 123 that provides information about various options for implementing the requirements as components of a business process. Based on processing the requirements, knowledge corpus, and characteristics of the VR component models, the ML trained computer model of the SUD VR content creation engine 120 selects one or more VR computer models to represent the modified components and SUD in a modified version of the VR environment simulation.

The knowledge corpus 123 comprises data specifying various configurations of digital and/or physical assets of various existing environments for which corresponding VR models are present in the VR model repository 112. For example, the knowledge corpus 123 comprises data structures specifying different types of equipment, devices, applications, and the like, along with their operational characteristics, performance information, and the like. This information may be obtained from manufacturers of the physical assets and/or providers of the digital assets, and may be obtained from users of such assets in actual business processes and existing environments. For example, a user may implement a particular camera based inspection system (camera hardware along with software to analyze captured images) in their business process, which may or may not be a packaging process. The user may provide performance information and information indicating the particular integration of the particular camera based inspection system in the business process and existing environment. For example, the user may specify that they integrated the camera based inspection system at an exit of leather curing equipment, oriented at a particular orientation and location relative to the leather curing equipment, and that this achieved a 90% accuracy in evaluating the quality of the leather produced. This information may be recorded in the knowledge corpus and the ML model of the SUD VR content creation engine 120 may ingest this information along with the requirements data structure 122 and determine that this same camera based inspection system is a potential option for achieving the requirements because it is an automated system for inspection and achieves a 90% accuracy in quality assessments. The ML model may evaluate various possible solutions documented in the knowledge corpus 123 and rank them and select a candidate as a solution to the requirements data structure 122 such that the corresponding VR model from the repository 112 may be retrieved, configured, and added to the VR environment simulation.

In some illustrative embodiments, the knowledge corpus 123 may traverse multiple different types of business processes, e.g., leather manufacturing, product packaging, or any of a number of other types of business processes. In other illustrative embodiments, there may be a plurality of knowledge corpora 123 provided, each specific to a particular type of business process, or subset of types of business processes, e.g., a separate knowledge corpus for manufacturing business processes of different types, a separate knowledge corpus for product packaging business processes of different types, etc. In the case of different knowledge corpora 123 being provided, based on the type of business process being modeled in the VR environment simulation, a corresponding knowledge corpus 123 is selected from stored knowledge corpora 123 of a corporate storage system 124.

It should be appreciated that though this process one or more VR models may be selected from the repository 112 based on an evaluation of the requirements data structure 122 and the knowledge corpus 123 to represent the modified VR components for inclusion in the "to be scenario" VR environment simulation 125. However, the selected VR models may be associated with components that have not been used in the particular business process being modeled, e.g., the camera based inspection system mentioned above may have been implemented in a leather curating stage of a leather manufacturing process, but may not have been previously used in a product packaging process, or at least the specific product packaging process being modeled by the VR environment simulation. Thus, it is still needed to simulate the integration of such modifications in the specific baseline VR environment to thereby generate the "to be scenario" VR environment simulation 125 to be able to accurately identify how this solution for achieving the requirements of the requirements data structure 122 will operate in the modeled VR environment of the business process of interest.

The resulting SUD VR component model(s) selected form the repository 112 is/are then aggregated with the other VR models of the baseline VR environment simulation 115 to generate a modified VR environment simulation 125 that is provided to the VR framework 130 for rendering the modified VR environment as part of the VR environment simulation 132. Once the modified VR environment simulation 132 is rendered by the VR framework 130, the modified VR environment simulation 132 represents a "to be scenario" VR environment simulation 125 or "to be" business model. Users, such as business level users or the like, can then use VR equipment 161 coupled to client computing devices 160 to interact with the various VR components, both baseline VR components and the VR components of the SUD, in the "to be scenario" of the VR environment simulation 132. The user input via the VR equipment 161 and client computing device 160 may take many different forms, but in general will be directed to modifying the operation of the VR components of the VR environment simulation 132 in accordance with business process attributes. For example, the user input may modify the operating conditions of a VR component, e.g., changing a speed of operation, changing a temperature, changing a number of units manufactured per unit time, changing a quality metric of the units, adding a new functionality corresponding to the SUD to a VR component, adding an additional new functionality as a completely new VR component in addition to the existing components, etc.

The context aware test data generation engine 140 comprises logic that monitors the VR environment simulation 132 while users interact with the VR environment simulation 132 via their VR equipment and client computing devices 160, to collect context aware data while users generate various context based scenarios through their user input to modify operational characteristics of the various VR components within the VR environment simulation 132, which has been modified to include the SUD VR component(s). The context aware test data generation engine 140 collects inputs and outputs to each of the VR components as well as user inputs to modify operations of the VR components. The user inputs to modify operations of the VR components define different context scenarios with the input and output data for the VR components representing the context data for the context scenario. This context data is stored in association with the identification of the context scenario. The context data may then be used as a basis for the context aware test data generation engine 140 to extract context aware test data for output as part of a context aware test dataset for use in SUD coding and testing via an integrated development environment (IDE).

Based on VR environment simulation 132 of the "to be scenario" of the business process, the context aware test data generation engine 140 identifies different types of contextual situations based on the user input, and accordingly identifies what types of functionalities are also to be tested with the coded version of the SUD when it is generated via the IDE. Thus, for example, in the example of the requirements data structure 122 specifying that an automated inspection system with 90% accuracy is to be implemented in the existing business process, a corresponding context may be generated for each possible solution to provide this automated inspection system, e.g., different numbers of cameras, different orientations and locations of the cameras relative to the other equipment, different software configurations of the camera based system, etc., which may be defined based on user manipulation of the VR environment simulation 132. For each such context, the corresponding results of the VR environment simulation 132 occurring after such modifications of the VR environment may be captured with regard to the business process as a whole, and specifically with regard to the VR components used to model the particular solution to the requirements of the requirements data structure 122, e.g., the camera based inspection system VR model(s). This context aware test data 150 indicates conditions that the SUD that will operate with after deployment, such a contexts in which camera based inspection system will operate such that the SUD being developed for use with the camera based inspection system should be tested for these contexts, e.g., an image analysis software that is being developed (the SUD) should be tested for the particular contexts identified through the VR environment simulation 132.

The context aware test dataset 150 generated by the context aware test data generation engine 140 is input to the IDE 170 that is used to generate and test the code for implementing the SUD as an actual software application. The context aware test dataset 150 may be implemented in the testing tools of the IDE 170 to test the coded version of the SUD and thereby test the code according to the VR environment simulation of the deployment environment for the SUD. Thus, a more thorough testing of the code is achieved by identifying scenarios of the deployment environment that otherwise may not be identified by human testers.

Figure 2:
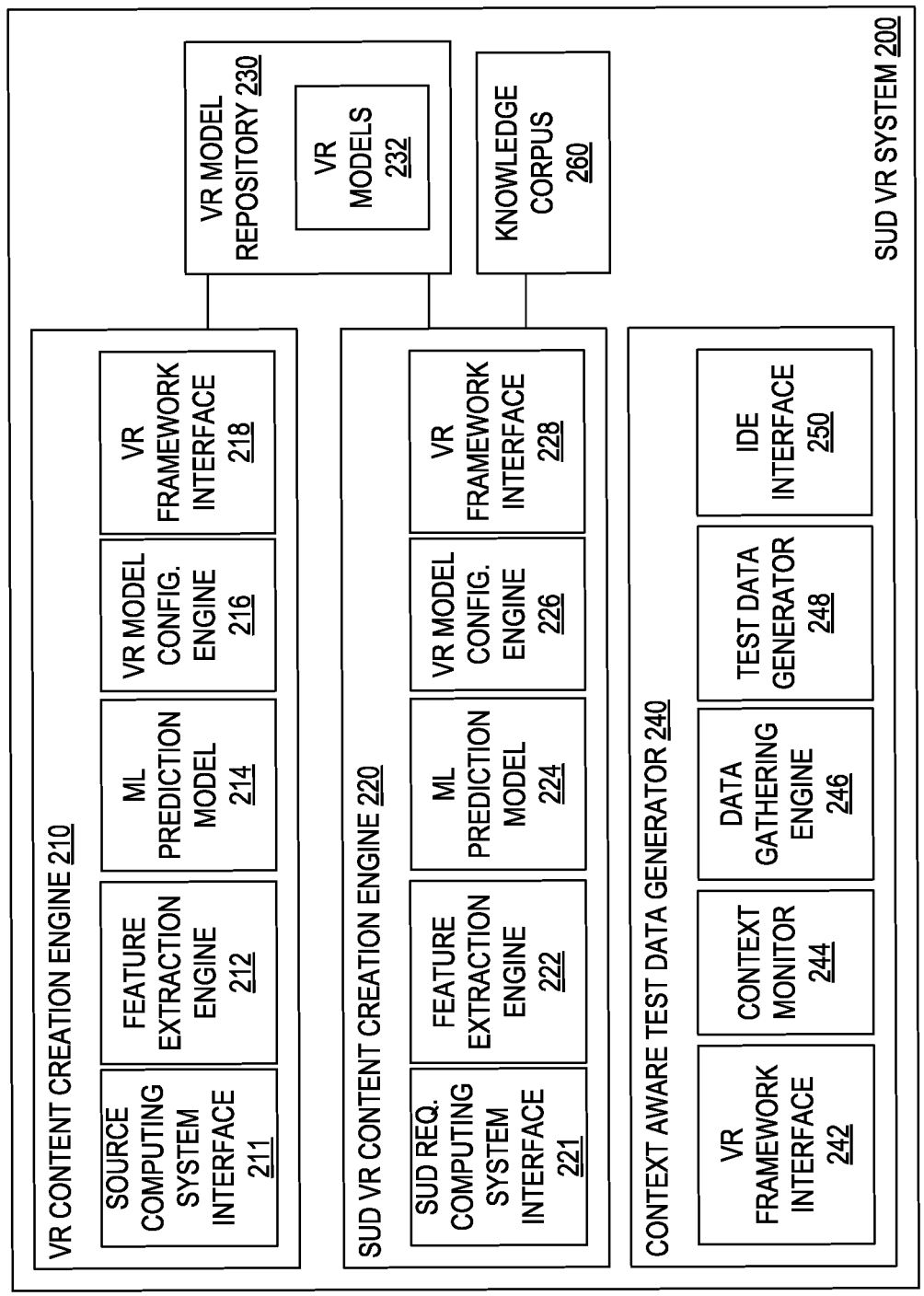
FIG. 2 is an example block diagram of the primary operational elements of a SUD virtual reality based context testing data generator in accordance with one illustrative embodiment.

FIG. 2 is an example block diagram of the primary operational elements of a virtual reality based context testing data generator in accordance with one illustrative embodiment. The elements shown in FIG. 2 may be implemented as part of a SUD VR system, such as SUD VR system 100 in FIG. 1, that operates to generate a VR environment simulation of a business process in which the SUD is represented as a VR component based on the requirements specification for the SUD, i.e., prior to the SUD being coded, tested, and deployed. In some illustrative embodiments, the elements shown in FIG. 2 may be implemented as software applications or logic executing on one or more computing devices such that the software applications specifically configure the one or more computing devices to be specialized computing devices configured to perform the functions attributed to the corresponding elements. In some illustrative embodiments, the elements may also be implemented as dedicated hardware devices, configured through hard coded mechanisms, such as circuitry, firmware, and the like, to perform the functions attributed to the corresponding elements. In other illustrative embodiments, a combination of executed software applications and dedicated hardware elements may be used to implement the functionality attributed to the elements without departing from the spirit and scope of the present invention.

As shown in FIG. 2, the SUD VR system 200 includes a VR content creation engine 210, a SUD VR content creation engine 220, a VR model repository 230, and a context aware test data generator 240. The VR content creation engine comprises one or more source computing system interfaces 211, a feature extraction engine 212, a machine learning (ML) prediction model 214, a VR model configuration engine 216, and a VR framework interface 218. The source computing system interface(s) 211 provide logic for performing data communication between source computing systems and the SUD VR system 200, via one or more data networks, so as to receive input data from the source computing systems, e.g., application landscape input data 102, metadata and codebase input data 104, and/or log input data 106 in FIG. 1. The feature extraction engine 212 comprises logic that parses the received input data from the source computing systems via the source computing system interface 211 and extracts from the received data portions of the data corresponding to input features for the ML prediction model 214. It should be appreciated that the features may include a subset of the raw data received from the source computing systems and/or may include derived features that are generated from the raw data, e.g., aggregates of raw data values, statistical measures, or the like.

The features extracted by the feature extraction engine 212 are input to the ML prediction module 214 which is a trained machine learning model that processes the input features to identify one or more VR component models corresponding to each application present in the application landscape of an existing business process that is to be modeled as part of the VR environment simulation. For example, the ML prediction model 214 may be a deep learning neural network computer model (DNN), recurrent neural network (RNN), generative adversarial network (GAN), Random Forest model, or any other known or later developed machine learning trained model that is trained through a supervised or unsupervised machine learning process to generate predictions, or classifications, of input features which are then mapped to VR component models in the VR model repository 230. The VR model repository 230 comprises predefined VR component models 232 for different types of applications which can be configured to generate a specific VR component model 232 for a particular application in the application landscape based on the features extracted from the input data from the source computing systems. For an application in the application landscape, one or more of the VR component models 232 may be identified as corresponding to the application, with the VR component models 232 modeling the application as well as any equipment associated with the application.

The VR model configuration engine 216 comprises logic for configuring the VR component models selected from the VR model repository 230 to specifically represent the corresponding application and its corresponding equipment for each application in the application landscape of the existing business process. This configuration may comprise setting parameters of the VR component model to values and settings corresponding to the features extracted from the input data by the feature extraction engine 212, for example. The combination of these configured VR component models represents the existing business process in a manner that may be rendered by the VR framework as a VR environment simulation through which users may interact with the business process and generate different contextual scenarios for data gathering and test data generation. The configured VR component models are output to the VR framework for rendering via the VR framework interface 218.

The SUD VR creation engine 220 comprises elements 222-228 that are similar to the elements 212-218 of VR creation engine 210 and operate in a similar manner. However, the SUD VR creation engine 220 operates on the requirements data structure 122 that defines the requirements for the SUD, rather than on the input data from the source computing systems, and further operates on the knowledge corpus 260 to determine a VR model to represent the SUD and its equipment in a modified, or "to be scenario", version of the VR environment simulation. Thus, the SUD VR creation engine 220 comprises a SUD requirements interface 221 through which the requirements data structure is received. The feature extraction engine 222 is configured to extract features from the SUD requirements data structure that are used by the ML prediction model 224, which may be similar features to that extracted by the feature extraction engine 222 or may be different features specific to the SUD requirements data structure. The ML prediction model 224 may operate on these features, as well as knowledge present in the knowledge corpus 260, and is trained to predict a VR component model 232 of the VR model repository 230 for representing the SUD based on the processing of these features, the knowledge corpus 260, and requirements specified in the requirements data structure, through the ML prediction model 224. Similar functionality as discussed above may be performed by the VR model configuration engine 226 and VR framework interface 228 to generate a VR component model for representing the SUD in the VR environment simulation.

The context aware test data generator 240 provides logic to monitor the VR environment simulation and gather data from the VR environment simulation for various contexts and generate test data for testing of coded versions of the SUD during software development through an IDE, or the like. As shown in FIG. 2, the context aware test data generator 240 comprises a VR framework interface 242, a context monitoring engine 244, a data gathering engine 246, a test data generator 248, and an IDE interface 250. The VR framework interface 242 provides logic for data communication with the VR framework to monitor the VR environment simulation and gather data from the VR environment simulation. The context monitor engine 244 comprises logic to monitor the VR environment simulation to identify changes in contexts of the VR environment simulation for generation of test datasets. This monitoring may comprise, for example, monitoring user interaction with the VR environment simulation to identify changes performed by the users to thereby define different contexts for test data generation. Thus, the context monitoring engine 244 detects when a user interacts with the VR environment simulation and then triggers data gathering for the corresponding contextual scenario.

The data gathering engine 246 comprises logic to gather input and output data for each of the VR component models of the VR environment simulation in response to the detection of a context change in the VR environment simulation. The data gathering engine 246 collects the data for each VR component model and stores it in association with an identifier of the context scenario, which may include the particular user inputs provided to modify the operational parameters of the business process to define a new contextual scenario. The stored data for the contextual scenario is provide to the test data generator 248 which comprises logic to extract and generate test data from the stored data for the contextual scenario. The resulting test data is stored as a test dataset for the contextual scenario that may then be used for testing the coded version of the SUD. The test datasets generated by the test data generator 248 are provided to the IDE via the IDE interface 250. These test datasets may be stored by the IDE for later use in testing code for the SUD that may be generated. Thus, a more comprehensive test dataset that reflects the actual deployment environment is generated and used to test the code for the SUD and thereby provide an application code that has fewer bugs or errors since such bugs or errors are more accurately identified through testing and rectified during the development process prior to deployment.

Figure 3A:
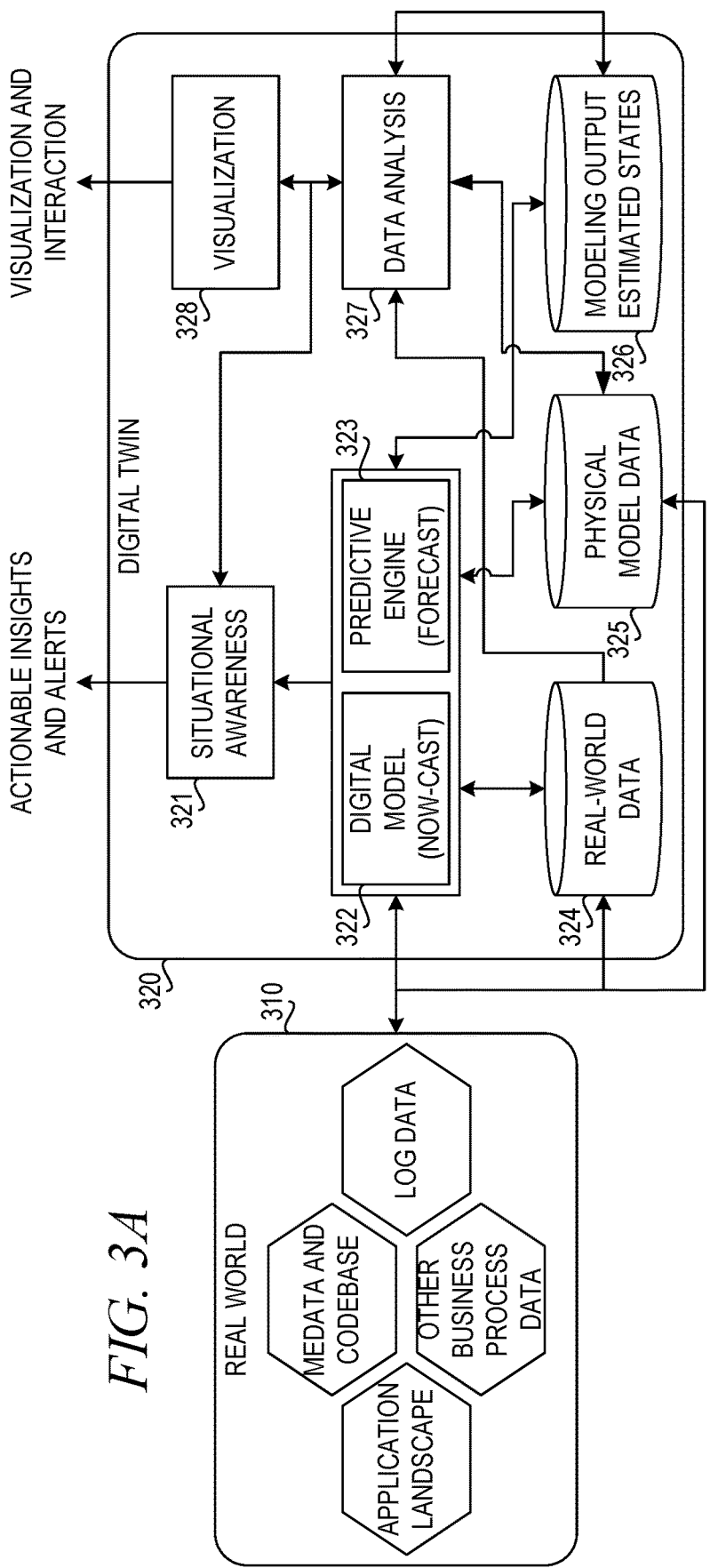
FIG. 3A is an example block diagram of a digital twin simulation and prediction engine in accordance with an illustrative embodiment.

FIG. 3A is a block diagram of a digital twin simulation and prediction engine in accordance with an illustrative embodiment. The digital twin simulation and prediction engine of FIG. 3A may be used to implement digital twin models for the various software application and equipment components of the VR environment simulation, e.g., the VR models of the VR environment simulation. The digital twin models may represent both baseline VR components as well as VR component(s) for the SUD.

As shown in FIG. 3A, the digital twin engine 320 receives real-world data 310 from the existing software applications and equipment of the existing business process, and stores the real-world data in storage 324. Data underpins the digital twin engine 320 simulation and prediction capabilities. The representation of the real-world (model data) is key to modeling the real-world existing business process as well as predicting the states of the business process when modified by the inclusion of the SUD VR model and simulating the business process in response to user interaction with the VR environment simulation. Real-world data 310 provides the collected state of the real-world existing components, and the modeling output is generated by the simulations. In accordance with the illustrative embodiment, real-world data 310 includes application landscape input data 102, metadata and codebase input data 104, and log input data 106, for example, gathered from real-world components of an existing business process, and which may be gathered from corresponding computing devices, sensors, and the like, that implement the applications and equipment for performing the business process, as well as sources of business process application landscape, metadata and codebase, and log information for the business process components.

Digital twin simulation and prediction engine 320 includes digital model 322 and predictive engine 323. Digital model 322 provides now-cast simulation of the software applications and equipment of the business process based on real-world data 324 gathered from various data gathering devices or systems, e.g., sensors, logging computing systems, code source computing systems, and the like, as well as VR model data 325. This includes not only each individual connected VR component but the entire VR environment simulation. Thus, digital model 322 provides a virtual representation of the real-world counterpart of the business process software application/equipment components.

Predictive engine 323 provides forecast simulation of future states within the business process based on real-world data 324 and VR model data 325. Predictive engine 323 combines now-cast simulation data and historical datasets to perform what-if scenario predictions. Digital model 322 and predictive engine 323 generate modeling output estimated states 326. These modeling output estimated states 326 include contextual situations that may affect the business process.

Data analysis component 327 performs data analysis on real-world data 324, physical model data 325, and modeling output estimated states 326 to generate insights about what is currently happening in the VR environment simulation and to identify contextual situations that are likely to occur and to affect the VR environment simulation, including the SUD VR component in the case of the modified VR environment simulation. Situational awareness component 321 generates actionable insights and alerts-based on the current state of the VR environment simulation of the business process and the predicted changes in contextual situations. Visualization component 328 provides visualization of data and interaction with a user for the VR component corresponding to the digital twin.

Digital twin simulation and prediction engine 320 gathers a vast amount of real-world data, simulates a business process with regard to one or more VR components, and predicts a vast number of contextual situations. Thus, digital twin simulation and prediction engine 320 provides actionable insights, simulations, and a connected view of the VR environment simulation of the business process. Digital twin simulation and prediction engine 320 uses real-world gathered data to make predictive recommendations through machine learning and artificial intelligence. Simulations can generate huge amounts of data, potentially much more data than the real-world can generate. Digital twin simulation and prediction engine 320 creates a virtual representation of complex connected components of a business process that evolves and may be manipulated through a VR simulation, which cannot be achieved manually or using the human mind.

Figure 3B:
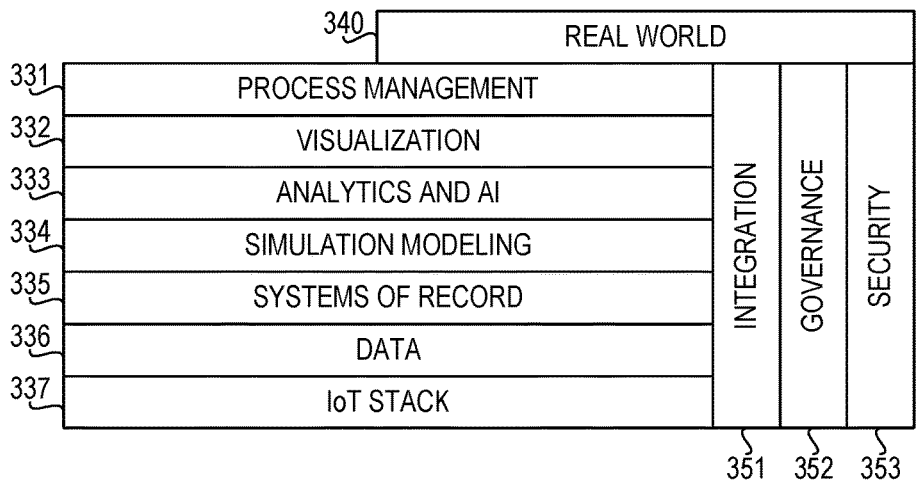
FIG. 3B is an example block diagram illustrating a digital twin architecture in accordance with an illustrative embodiment.

FIG. 3B is a block diagram illustrating a digital twin architecture in accordance with an illustrative embodiment. A digital twin simulation and prediction engine is not a stand-alone application. The digital twin architecture integrates into the VR framework to generate VR component representations, simulate the operation of these VR components in the context of various scenarios, make predictive states based on simulation of the VR components and the business process, and gather contextual data for generating test data to test coded versions of SUDs.

The digital twin simulation and prediction engine includes the real-world 340 and seven layers of information management and manipulation. These layers include process management 331, visualization 332, analytics and artificial intelligence 333, simulation modeling 334, systems of record 335, data 336, and an Internet-of-Things (IoT) stack 337. The digital twin simulation and prediction engine also includes integration 351, governance 352, and security 353, which ensure the digital twin is secured, appropriately coupled, and governed to ensure accuracy and quality of data.

The real-world 340 includes people, places, devices, assets, content, processes, and organizations. People may include drivers, passengers, pedestrians, and workers. Places may include the locations of connected devices, software applications, and infrastructure. Devices may include the connected business process equipment, computing devices, sensors, infrastructure, and the like. Content may include information consumed by software applications in the connected software applications and equipment. Processes may include activities performed to provide or to consume the connected software applications and equipment services. Organizations may include the connected software application and equipment services providers and other organizations that are part of or interface with the components of the business process.

Process management 331 may include business process models, workflow, simulation tools, resource allocation, and prioritization. Visualization 332 may include, for example, human readable/interpretable visualizations, abstract representations, geometric representations, physical re-imaging, two-dimensional or three-dimensional representations, augmented reality (AR) or virtual reality (VR) representations, a real-time dashboard, alerts, etc. Analytics and AI 333 may include statistical representation, descriptive or diagnostic analysis, predictive analysis, optimizations, management information system (MIS) decision making, deep machine learning (ML), predictive maintenance, pattern recognition, feature extraction, and event pattern identification. Simulation modeling 334 includes multi-dimensional predictive models, stochastic simulation, deterministic simulation, process simulation, Monte Carlo simulation, discrete event simulation, mathematical representation, function simulation, and production of unseen states. Systems of record 335 may include, for example, enterprise resource planning (ERP), computer aided design (CAD), enterprise architecture management (EAM), product lifecycle management (PLM), global information system (GIS), configuration management database (CMDB), and requirements data structures. Data 336 may include archiving, schemas, aggregation, infrastructure data, states (current and historic), simulation test data, external sources, etc. IoT stack 337 may include sensors, real-world data, communications, IoT platforms, etc.

Integration 351 includes process, API management, simulation couplers, applications, enterprise service bus (ESB), data, protocols, networks, etc. Governance 352 includes data lifecycle, data access control, master data management, simulation input and output version control, data catalogue, model governance, interfaces, ethics, and standards. Security 353 includes perimeter (IoT sensor data), data security and privacy, intrusion detection, identity and access management, encryption, endpoint management, and device identity.

The digital twin simulation and prediction engine of the illustrative embodiment is not a product that can be purchased over the counter. Instead, the digital twin simulation and prediction engine is specifically configured, designed, and trained to represent the VR environment simulation of a business process that is modified to include a SUD and to predict changes in contextual situations. The digital twin simulation and prediction engine is a result of significant systems integration which cannot be performed as mental processes and is not directed to methods of organizing human activity.

Figure 4:
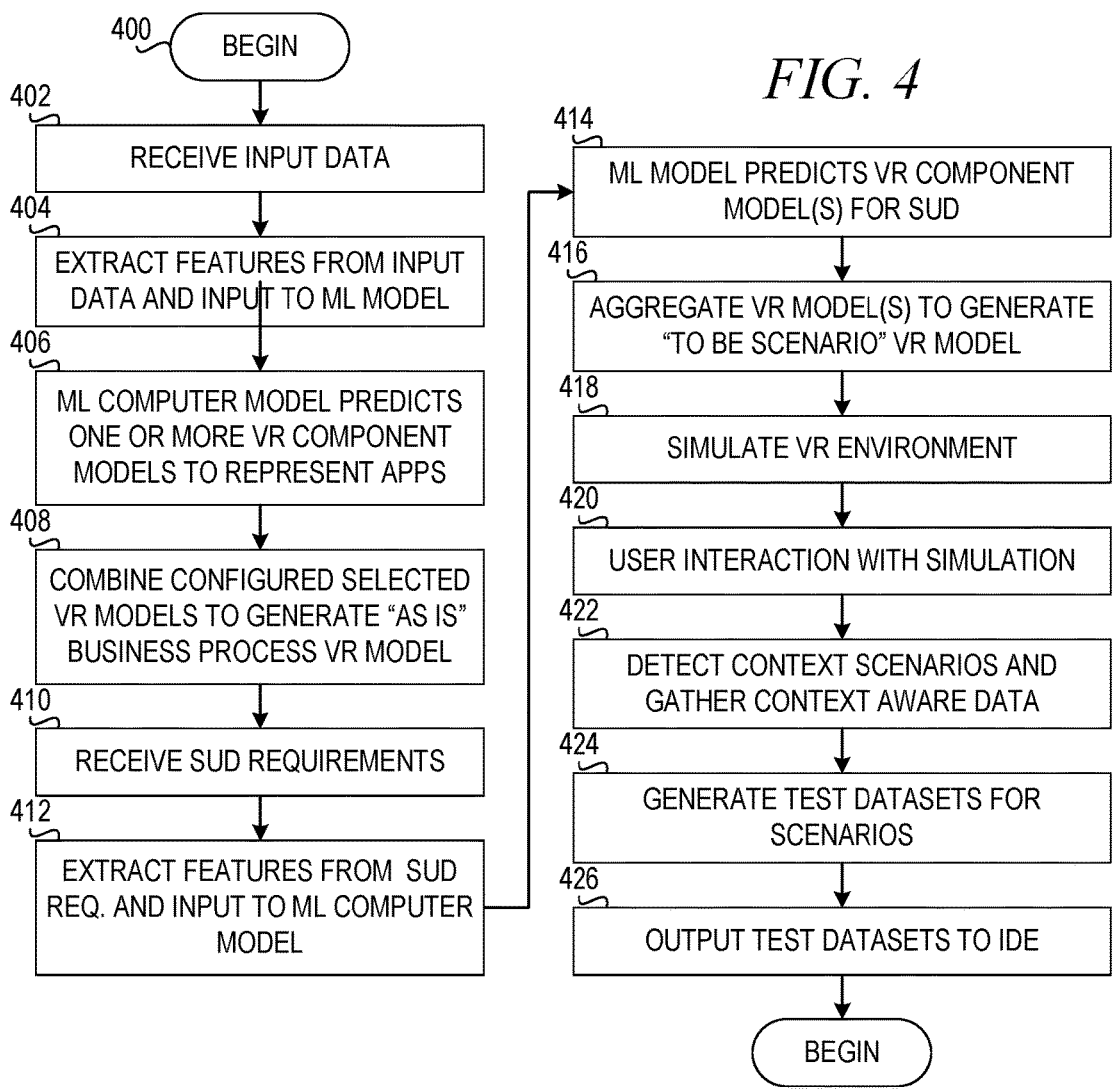
FIG. 4 is a flowchart outlining an example operation for generating contextual testing data using virtual reality interactions in accordance with one illustrative embodiment.

FIG. 4 is a flowchart outlining an example operation for generating contextual testing data using virtual reality interactions in accordance with one illustrative embodiment. The operation outlined in FIG. 4 may be implemented, for example, by a SUD VR system, such as system 100 in FIG. 1.

As shown in FIG. 4, the operation 400 starts by receiving input data, from various source computing systems, for an existing business process that is to be modeled as a VR environment simulation (step 402). Features for identifying VR component models are extracted from the input data (step 404) and input to a machine learning computer model that predicts one or more VR component models to represent the applications in the application landscape of the existing business process (step 406). The selected VR component models are combined to generate an "as is" business process VR model for the existing business process (step 408).

The requirements for software under development (SUD) are received as part of a requirements data structure (step 410). Features for identifying a VR component model for the SUD are extracted from the SUD requirements data structure (step 412) and input to a machine learning computer model that predicts one or more VR component models to represent the SUD in the VR environment simulation (step 414). The VR component model(s) for the SUD are aggregated with the VR component models for other elements of the existing business process to generate a modified VR environment simulation (step 416). The VR environment simulation is executed (step 418) and a user interacts with the VR environment simulation to generate contextual scenarios (step 420). The contextual scenarios are detected, and corresponding context aware data gathering is performed (step 422). The context aware data is then used as a basis for generating test datasets for the detected contextual scenarios (step 424) which is then output to an IDE for use in testing code corresponding to the SUD requirements (step 426). The operation then terminates.

Thus, as discussed above, the illustrative embodiments provide mechanisms that facilitate improved test dataset generation for a software development lifecycle. The mechanisms of the illustrative embodiments utilize virtual reality simulation of the business process and the expected deployment environment as a means by which test data may be gathered that is more representative of the actual business process and deployment environment in which the code will likely be deployed prior to actually coding the software under development. That is, based on the software under development requirements, the software application may be simulated in the context of the other elements of the business process and deployment environment and different contextual scenarios may be explored to define test data that should be used to test the eventual code generated through the development environment. As a result, the code that is generated prior to deployment will be tested more thoroughly and more accurately making for improved error or bug detection and less error or buggy deployed applications.

Figure 5:
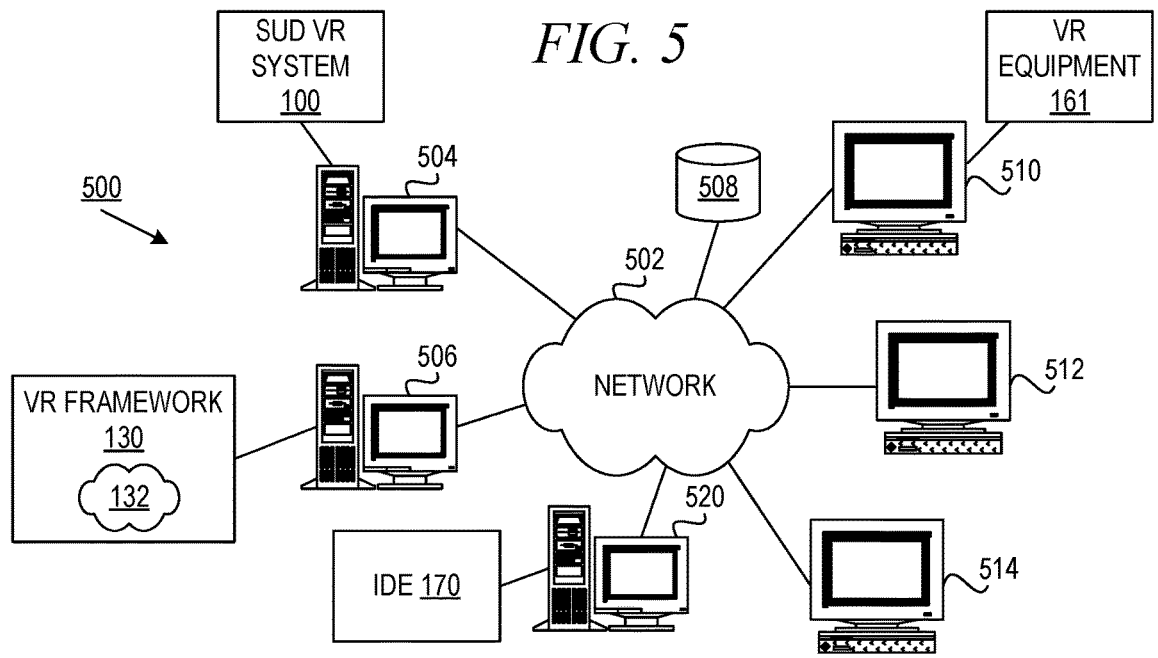
FIG. 5 is an example diagram of a distributed data processing system in which aspects of the illustrative embodiments may be implemented.
Figure 6:
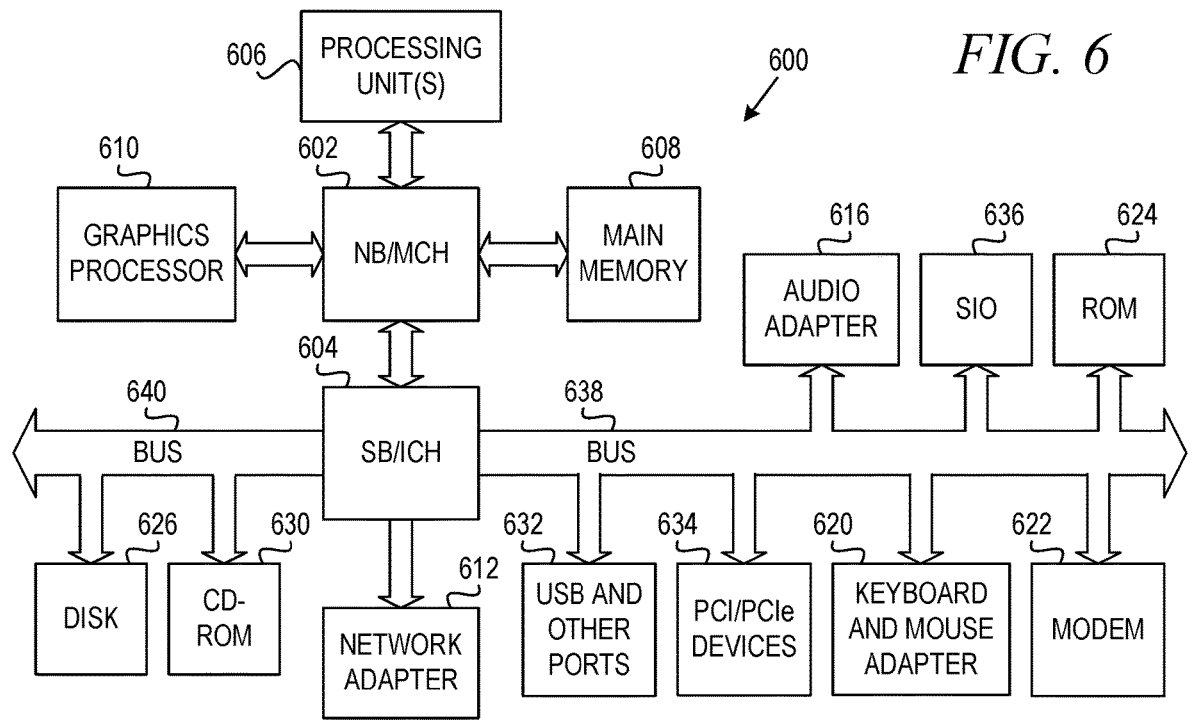
FIG. 6 is an example block diagram of a computing device in which aspects of the illustrative embodiments may be implemented. F

The illustrative embodiments may be utilized in many different types of data processing environments. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, may be specifically configured to implement a SUD virtual reality (VR) system 100. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates test dataset generation through representation of the business process and the requirements of the software under development as a virtual reality environment simulation with which users may interact to thereby generate contextual scenarios and gather data about the deployment environment and business process that provides improved test dataset generation.

In addition to the server 504, or a plurality of server computing systems, implementing the SUD VR system 100, one or more of the server computing systems, e.g., server 506, may implement a VR framework 130 that takes the VR component models generated by the SUD VR system 100 and generates a VR environment simulation 132 of the business process, including the SUD representation generated from the SUD requirements. A user of a client device, such as client 510, may access the VR environment simulation and render the VR simulation locally via their client computing device 510 and associated VR equipment 520, such as a VR headset, microphone, user interface devices, e.g., controllers, gloves, and other peripheral devices having sensors and mechanisms through which the user may provide input and receive feedback from the VR environment simulation. In addition, one or more server computing devices, e.g., server 520, may implement an integrated development environment (IDE) 170 with which users of client computing devices, e.g., clients 512-514, may operate to develop code for the SUD and test the generated code with test datasets generated by the SUD VR system 100 in the manner described previously with regard to one or more illustrative embodiments.

As noted above, the mechanisms of the illustrative embodiments utilize specifically configured computing devices, or data processing systems, to perform the operations for VR environment simulation-based test dataset generation for use in the software development lifecycle of an application. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System p° computer system, Power™ processor-based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the SUD VR system 100.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

As mentioned above, while the illustrative embodiments are described with regard to VR simulation implementations, the illustrative embodiments are not limited to such. To the contrary, the illustrative embodiments may operate to generate any suitable simulation of a deployment environment with which a user may interact as if the user were physically present relative to the digital and/or physical assets of the deployment environment. These types of simulations may include mixed reality simulations that involved VR, AR, any combination of VR and AR, or any other simulation of the deployment environment with which the user may interact as if they are physically present in the digital environment simulation. As such, in cases above where VR is specifically referenced, such mechanisms may be modified to support AR, VR and AR combinations, or other deployment environment simulations. For example, the user may utilized AR equipment instead of, or in addition to VR equipment, to interact with an AR and/or VR simulation of the deployment environment.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for generating a test dataset for software application development testing, the method comprising:

generating a baseline mixed reality (MR) environment simulation of an existing business process comprising one or more first MR component models that model applications of an application landscape of the existing business process;

receiving a requirements data structure for a software under development (SUD) application that is to be developed;

generating one or more second MR component models, to represent the SUD application, based on a machine learning computer model processing of features extracted from the requirements data structure and knowledge data in a knowledge corpus;

aggregating the one or more second MR component models with the one or more first MR component models of the baseline MR environment simulation to generate a modified MR environment simulation;

executing the modified MR environment simulation to simulate the MR environment;

monitoring the simulation of the MR environment for user input specifying a contextual scenario;

collecting data from the one or more first MR component models and one or more second MR component models in response to detecting user input specifying a contextual scenario; and generating a test dataset for testing a coded version of the SUD application based on the contextual scenario and the collected data corresponding to the contextual scenario.

2. The method of claim 1, wherein generating the baseline MR environment simulation comprises generating, for each application in an application landscape input, one or more MR component models for the application that models at least one of digital or physical assets for implementing the application in the existing business process.

3. The method of claim 2, wherein generating the one or more MR component models comprises selecting at least one pre-defined MR component model from a MR model repository based on an application landscape input, a codebase and metadata input, and a log data input.

4. The method of claim 2, wherein the one or more MR component models comprise digital twin computer models.

5. The method of claim 1, wherein the requirements data structure specifies a high level definition of a modification to the existing business process, and wherein generating one or more second MR component models, to represent the SUD application, comprises selecting a solution specified in the knowledge base based on processing the requirements data structure through the machine learning computer model, and selecting one or more MR component models corresponding to the selected solution from a MR model repository.

6. The method of claim 1, wherein aggregating the one or more second MR component models with the one or more first MR component models of the baseline MR environment simulation to generate a modified MR environment simulation comprises at least one of adding the one or more second MR component models as new MR component models to the baseline MR environment simulation, or replacing at least one first MR component model with at least one of the one or more second MR component models.

7. The method of claim 1, wherein collecting data from the one or more first MR component models and one or more second MR component models in response to detecting user input specifying a contextual scenario comprises storing, for each of a plurality of contextual scenarios, corresponding context aware data for the corresponding contextual scenario, and wherein the test dataset comprises test data for each of the contextual scenarios.

8. The method of claim 1, wherein the requirements data structure specifies a desired functionality and desired performance of a component of a modification of the existing business process, and wherein the specification of the desired functionality and desired performance is processed by the machine learning computer model to identify a solution specified in the knowledge corpus that provides the desired functionality and desired performance, and for which a MR component model is defined in a MR component model repository.

9. The method of claim 1, further comprising:
outputting the testing dataset to an integrated development environment (IDE) computing system; and
testing the coded version of the SUD application in the IDE computing system using the test dataset.

10. The method of claim 1, wherein the existing business process is at least one of a manufacturing process for manufacturing a good or a packaging process for packaging a physical product, and wherein the one or more first MR component models comprise MR computer models that model physical machines or computing devices involved in the manufacturing process or packaging process.

11. A computer program product comprising a computer readable storage medium having a computer readable program stored therein, wherein the computer readable program, when executed in a data processing system, causes the data processing system to:

generate a baseline mixed reality (MR) environment simulation of an existing business process comprising one or more first MR component models that model applications of an application landscape of the existing business process;

receive a requirements data structure for a software under development (SUD) application that is to be developed;

generate one or more second MR component models, to represent the SUD application, based on a machine learning computer model processing of features extracted from the requirements data structure and knowledge data in a knowledge corpus;

aggregate the one or more second MR component models with the one or more first MR component models of the baseline MR environment simulation to generate a modified MR environment simulation;

execute the modified MR environment simulation to simulate the MR environment;

monitor the simulation of the MR environment for user input specifying a contextual scenario;

collect data from the one or more first MR component models and one or more second MR component models in response to detecting user input specifying a contextual scenario; and generate a test dataset for testing a coded version of the SUD application based on the contextual scenario and the collected data corresponding to the contextual scenario.

12. The computer program product of claim 11, wherein generating the baseline MR environment simulation comprises generating, for each application in an application landscape input, one or more MR component models for the application that models at least one of digital or physical assets for implementing the application in the existing business process.

13. The computer program product of claim 12, wherein generating the one or more MR component models comprises selecting at least one pre-defined MR component model from a MR model repository based on an application landscape input, a codebase and metadata input, and a log data input.

14. The computer program product of claim 12, wherein the one or more MR component models comprise digital twin computer models.

15. The computer program product of claim 11, wherein the requirements data structure specifies a high level definition of a modification to the existing business process, and wherein generating one or more second MR component models, to represent the SUD application, comprises selecting a solution specified in the knowledge base based on processing the requirements data structure through the machine learning computer model, and selecting one or more MR component models corresponding to the selected solution from a MR model repository.

16. The computer program product of claim 11, wherein aggregating the one or more second MR component models with the one or more first MR component models of the baseline MR environment simulation to generate a modified MR environment simulation comprises at least one of adding the one or more second MR component models as new MR component models to the baseline MR environment simulation, or replacing at least one first MR component model with at least one of the one or more second MR component models.

17. The computer program product of claim 11, wherein collecting data from the one or more first MR component models and one or more second MR component models in response to detecting user input specifying a contextual scenario comprises storing, for each of a plurality of contextual scenarios, corresponding context aware data for the corresponding contextual scenario, and wherein the test dataset comprises test data for each of the contextual scenarios.

18. The computer program product of claim 11, wherein the requirements data structure specifies a desired functionality and desired performance of a component of a modification of the existing business process, and wherein the specification of the desired functionality and desired performance is processed by the machine learning computer model to identify a solution specified in the knowledge corpus that provides the desired functionality and desired performance, and for which a MR component model is defined in a MR component model repository.

19. The computer program product of claim 11, wherein the computer readable program further causes the data processing system to:

output the testing dataset to an integrated development environment (IDE) computing system; and test the coded version of the SUD application in the IDE computing system using the test dataset.

20. An apparatus comprising:

at least one processor; and at least one memory coupled to the at least one processor, wherein the at least one memory comprises instructions which, when executed by the at least one processor, cause the at least one processor to:

generate a baseline mixed reality (MR) environment simulation of an existing business process comprising one or more first MR component models that model applications of an application landscape of the existing business process;

receive a requirements data structure for a software under development (SUD) application that is to be developed;

generate one or more second MR component models, to represent the SUD application, based on a machine learning computer model processing of features extracted from the requirements data structure and knowledge data in a knowledge corpus;

aggregate the one or more second MR component models with the one or more first MR component models of the baseline MR environment simulation to generate a modified MR environment simulation;

execute the modified MR environment simulation to simulate the MR environment;

monitor the simulation of the MR environment for user input specifying a contextual scenario;

collect data from the one or more first MR component models and one or more second MR component models in response to detecting user input specifying a contextual scenario; and generate a test dataset for testing a coded version of the SUD application based on the contextual scenario and the collected data corresponding to the contextual scenario.

* * * * *